(12) United States Patent
Yajima et al.

(10) Patent No.: US 9,441,734 B2
(45) Date of Patent: Sep. 13, 2016

(54) POWER UNIT AND STRADDLE-TYPE VEHICLE

(71) Applicant: YAMAHA HATSUDOKI KABUSHIKI KAISHA, Iwata-shi (JP)

(72) Inventors: Jun Yajima, Iwata (JP); Takuya Hanano, Iwata (JP); Masayuki Nakagawa, Iwata (JP)

(73) Assignee: YAMAHA HATSUDOKI KABUSHIKI KAISHA, Iwata-Shi (JP)

(*) Notice: Subject to any disclaimer, the term of this patent is extended or adjusted under 35 U.S.C. 154(b) by 163 days.

(21) Appl. No.: 14/543,183

(22) Filed: Nov. 17, 2014

(65) Prior Publication Data

US 2015/0135691 A1 May 21, 2015

(30) Foreign Application Priority Data

Nov. 20, 2013 (JP) ................. 2013-239836

(51) Int. Cl.
| | |
|---|---|
| F16H 3/08 | (2006.01) |
| F16H 59/02 | (2006.01) |
| F16H 63/18 | (2006.01) |
| F02B 61/02 | (2006.01) |
| F16H 63/14 | (2006.01) |
| F16H 57/031 | (2012.01) |
| F16H 57/02 | (2012.01) |

(52) U.S. Cl.
CPC ............. *F16H 63/18* (2013.01); *F02B 61/02* (2013.01); *F16H 63/14* (2013.01); *B60Y 2200/12* (2013.01); *F16H 57/031* (2013.01); *F16H 2057/0203* (2013.01); *F16H 2057/02065* (2013.01); *Y10T 74/19279* (2015.01)

(58) Field of Classification Search
CPC ........... F16H 3/006; F16H 3/02; F16H 59/02
USPC ....................... 74/325, 473.3, 473.35, 473.36
See application file for complete search history.

(56) References Cited

U.S. PATENT DOCUMENTS

| | | | |
|---|---|---|---|
| 4,834,219 A | 5/1989 | Inagaki et al. | |
| 4,836,156 A | 6/1989 | Inagaki et al. | |
| 4,848,170 A | 7/1989 | Inagaki et al. | |
| 6,589,025 B2 * | 7/2003 | Hojyo | ..................... F16N 13/20 184/6.5 |

(Continued)

FOREIGN PATENT DOCUMENTS

| | | |
|---|---|---|
| DE | 3739243 A1 | 7/1988 |
| EP | 2239430 A2 | 10/2010 |

(Continued)

OTHER PUBLICATIONS

Extended European Search Report dated Mar. 13, 2015.

*Primary Examiner* — Ha D Ho
(74) *Attorney, Agent, or Firm* — Rabin & Berdo, P.C.

(57) ABSTRACT

A power unit includes: a crankcase 24 that houses a shift drum 50, a shift lever 66, at least a portion of a shift shaft 74, and a stopper lever 78; and an oil pan 28 disposed under a lower crankcase 26. The lower crankcase 26 includes a frame portion 26F which is located above the oil pan 28 and to which a cover 29 is attached when viewed in an axial direction of the shift shaft 74. The shift lever 66 is disposed so that when the shift shaft 74 is located at a second rotational position, a portion of a second arm 70 of the shift lever 66 is located lower than the frame portion 26F of the lower crankcase 26 and inside the oil pan 28 as viewed in the axial direction of the shift shaft 74.

8 Claims, 14 Drawing Sheets

(56) References Cited

U.S. PATENT DOCUMENTS

| | | | |
|---|---|---|---|
| 7,669,574 B2 * | 3/2010 | Nagahashi | F01M 11/02 123/192.2 |
| 8,011,477 B2 * | 9/2011 | Shiozaki | F16H 57/0489 180/219 |
| 2010/0242893 A1 | 9/2010 | Negoro et al. | |
| 2011/0239805 A1 | 10/2011 | Fujimoto et al. | |

FOREIGN PATENT DOCUMENTS

| | | |
|---|---|---|
| EP | 2372196 A1 | 10/2011 |
| JP | 2010-236451 A | 10/2010 |

* cited by examiner

POWER UNIT AND STRADDLE-TYPE VEHICLE

CROSS-REFERENCE TO RELATED APPLICATIONS

This application claims priority to Patent Application No. 2013-239836 filed in Japan on Nov. 20, 2013, the entire contents of which are hereby incorporated by reference.

TECHNICAL FIELD

The present invention relates to power units and straddle-type vehicles.

BACKGROUND ART

A "shift drum type" transmission is often conventionally used in a straddle-type vehicle, for example. A shift drum type transmission includes: a plurality of first gears provided on a main shaft; and a plurality of second gears provided on a drive shaft. The first and second gears include movable gears that are movable axially. The shift drum type transmission further includes: a shift fork that axially moves the movable gears; and a shift drum provided with a groove with which the shift fork engages. The shift drum is connected to a shift shaft via a gear change mechanism. Upon rotation of the shift shaft, the shift drum rotates. Upon rotation of the shift drum, the shift fork moves along the groove. With the movement of the shift fork, the movable gears move axially. As a result, a combination of the first and second gears which intermesh with each other and to which a torque is transmitted is changed, thus changing a transmission gear ratio between the main shaft and the drive shaft.

The gear change mechanism includes: a shift lever fixed to the shift shaft; and a rotation plate fixed to an end of the shift drum. The shift lever is arranged to be engageable with the rotation plate. Upon rotation of the shift lever with the rotation of the shift shaft, the rotation plate receives a force from the shift lever and thus rotates. The shift drum rotates with the rotation of the rotation plate. As a result, a speed change is performed.

In general, a transmission is disposed inside a crankcase of a power unit. JP 2010-236451 A discloses a power unit in which a gear change mechanism is disposed in a lower portion of an interior of a crankcase. More specifically, JP 2010-236451 A discloses that a main shaft and a shift drum are disposed in a lower portion of an interior of the power unit, thus lowering its center of gravity.

SUMMARY OF INVENTION

Technical Problem

As mentioned above, a shift lever of a gear change mechanism rotates when a speed change is performed. Therefore, when the shift lever rotates, the gear change mechanism and a lower wall of a crankcase have to be prevented from coming into contact with each other. In conventional techniques, a layout of a gear change mechanism must be performed so that the gear change mechanism is located above a lower wall of a crankcase even when a shift lever rotates. In other words, a layout of a gear change mechanism must be performed so that the gear change mechanism is always located above a lower wall of a crankcase. Unfortunately, such conventional techniques do not allow a gear change mechanism to have high layout flexibility.

Accordingly, embodiments of the present invention provide a power unit that has a low center of gravity and allows a gear change mechanism to have high layout flexibility.

Solution to Problem

A power unit according to an embodiment of the present invention includes: a shift drum; a rotation plate fixed to an end of the shift drum, to thereby rotate with the shift drum, the rotation plate including an outer peripheral surface having a plurality of recessed portions; a shift lever configured to engage with the rotation plate; a shift shaft fixed to the shift lever, and being rotatable between a first rotational position and a second rotational position; a support shaft disposed substantially in parallel with the shift drum; a stopper lever rotatably supported by the support shaft; a stopper roller provided in the stopper lever, the stopper roller being configured to engage with one of the recessed portions of the rotation plate when the shift shaft is in the first rotational position; an elastic member configured to engage with the stopper lever, so as to apply a force to the stopper lever to thereby press the stopper roller against the one recessed portion; a crankcase housing the shift drum, the rotation plate, the shift lever, the support shaft, the stopper lever, the stopper roller, the elastic member, and at least a portion of the shift shaft; and an oil pan disposed under the crankcase. The crankcase includes a frame portion that is located higher than the oil pan and to which a cover is attached when viewed in an axial direction of the shift shaft. The shift lever and the stopper lever are so disposed that when the shift shaft is located at the second rotational position, at least one of a portion of the shift lever and a portion of the stopper lever is located lower than the frame portion of the crankcase and inside the oil pan as viewed in the axial direction of the shift shaft.

In the power unit according to the embodiment of the present invention, the shift lever and the stopper lever are disposed so that at least one of a portion of the shift lever and a portion of the stopper lever is located lower than the frame portion of the crankcase and inside the oil pan when the shift shaft is located at the second rotational position. Therefore, a layout of the shift lever and the stopper lever, each of which is a component of a gear change mechanism, is performed without the constraint that the shift lever and the stopper lever must always be located above a lower wall of the crankcase. Hence, the gear change mechanism and the shift drum are disposed at lower positions, thus lowering a center of gravity of the power unit. Moreover, layout flexibility of the gear change mechanism is increased. The gear change mechanism originally includes components to which oil is to be supplied, and therefore, there is no problem whatsoever even when the shift lever and the stopper lever, each of which is a component of the gear change mechanism, are located inside the oil pan. Thus, according to the embodiment of the present invention, a portion of an interior of the oil pan is effectively utilized as a space in which a portion of the gear change mechanism is to be housed.

According to another embodiment of the present invention, the crankcase may include a lower wall located below the shift lever and the stopper lever and above the oil pan. The lower wall of the crankcase may have an opening.

Thus, when the shift shaft is located at the second rotational position, at least one of a portion of the shift lever and a portion of the stopper lever is positioned inside the oil pan through the opening. As long as an area of the opening is kept to a minimum necessary to allow passage of at least one of a portion of the shift lever and a portion of the stopper lever through the opening, a sufficient area of the lower wall of the crankcase is ensured, thus maintaining rigidity of the crankcase at a high level.

According to still another embodiment of the present invention, the shift lever and the stopper lever may be so disposed that when the shift shaft is located at the first rotational position, the shift lever and the stopper lever are located higher than the lower wall of the crankcase as viewed in the axial direction of the shift shaft.

Thus, when the shift shaft does not rotate and is located at the first rotational position, the entire shift lever and the entire stopper lever are located higher than the lower wall of the crankcase. As a result, assembly of the gear change mechanism is facilitated.

According to yet another embodiment of the present invention, the shift lever may be so disposed that when the shift shaft is located at the second rotational position, a portion of the shift lever is located lower than the frame portion or the lower wall of the crankcase and inside the oil pan as viewed in the axial direction of the shift shaft.

Thus, the shift lever is disposed at a lower position. Therefore, layout flexibility of the gear change mechanism is increased.

According to still yet another embodiment of the present invention, the stopper lever may be so disposed that when the shift shaft is located at the second rotational position, a portion of the stopper lever is located lower than the frame portion or the lower wall of the crankcase and inside the oil pan as viewed in the axial direction of the shift shaft.

Thus, the stopper lever is disposed at a lower position. Therefore, layout flexibility of the gear change mechanism is increased.

According to another embodiment of the present invention, the power unit may further include: an internal combustion engine; and an exhaust pipe through which exhaust gas discharged from the internal combustion engine flows. The oil pan may include a first lower wall, and a second lower wall recessed downward from the first lower wall. In a plan view, the shift lever may overlap the first lower wall of the oil pan, and the stopper lever may overlap the first lower wall of the oil pan. The exhaust pipe may include an exhaust pipe portion disposed lower than the first lower wall of the oil pan, the exhaust pipe portion overlapping the first lower wall in the plan view. An upper end of the exhaust pipe portion may be located higher than a lower end of the second lower wall of the oil pan.

The exhaust pipe portion, which is a portion of the exhaust pipe, overlaps the oil pan in the plan view. More specifically, the exhaust pipe portion overlaps the first lower wall of the oil pan, and the upper end of the exhaust pipe portion is located higher than the lower end of the second lower wall of the oil pan. Hence, the exhaust pipe portion is disposed at a relatively high position while the exhaust pipe portion is located below the oil pan. As a result, a banking angle is ensured. The first lower wall of the oil pan overlaps the shift lever and the stopper lever in the plan view. In other words, the oil pan includes a portion that overlaps the shift lever and the stopper lever in the plan view, so that the oil pan has a large area in the plan view. Consequently, a volume of the oil pan is ensured even though the exhaust pipe portion is disposed below the first lower wall.

According to still another embodiment of the present invention, the power unit may further include: a main shaft having a plurality of first gears including a first movable gear that is movable around an axis of the main shaft; a drive shaft having a plurality of second gears including a second movable gear that is movable around an axis of the main shaft, the second gears being configured to intermesh with the first gears; and a shift fork configured to engage with the first and second movable gears. The shift drum may have a groove with which the shift fork engages. When viewed in the axial direction of the shift shaft, a center of the shift drum may be disposed lower than a center of the main shaft, and a center of the shift shaft is disposed lower than the center of the shift drum.

Thus, the shift shaft is disposed at a low position, thus lowering the center of gravity of the power unit. Since the shift shaft is located at a low position, a link mechanism through which the shift shaft and a shift pedal are connected to each other is reduced in length.

A straddle-type vehicle according to an embodiment of the present invention includes the above-described power unit.

According to the embodiment of the present invention, a straddle-type vehicle that achieves the above-described effects is obtained.

Advantageous Effects of Invention

Various embodiments of the present invention provide a power unit that has a low center of gravity and allows a gear change mechanism to have high layout flexibility.

DESCRIPTION OF EMBODIMENTS

First Embodiment

Figure 1:
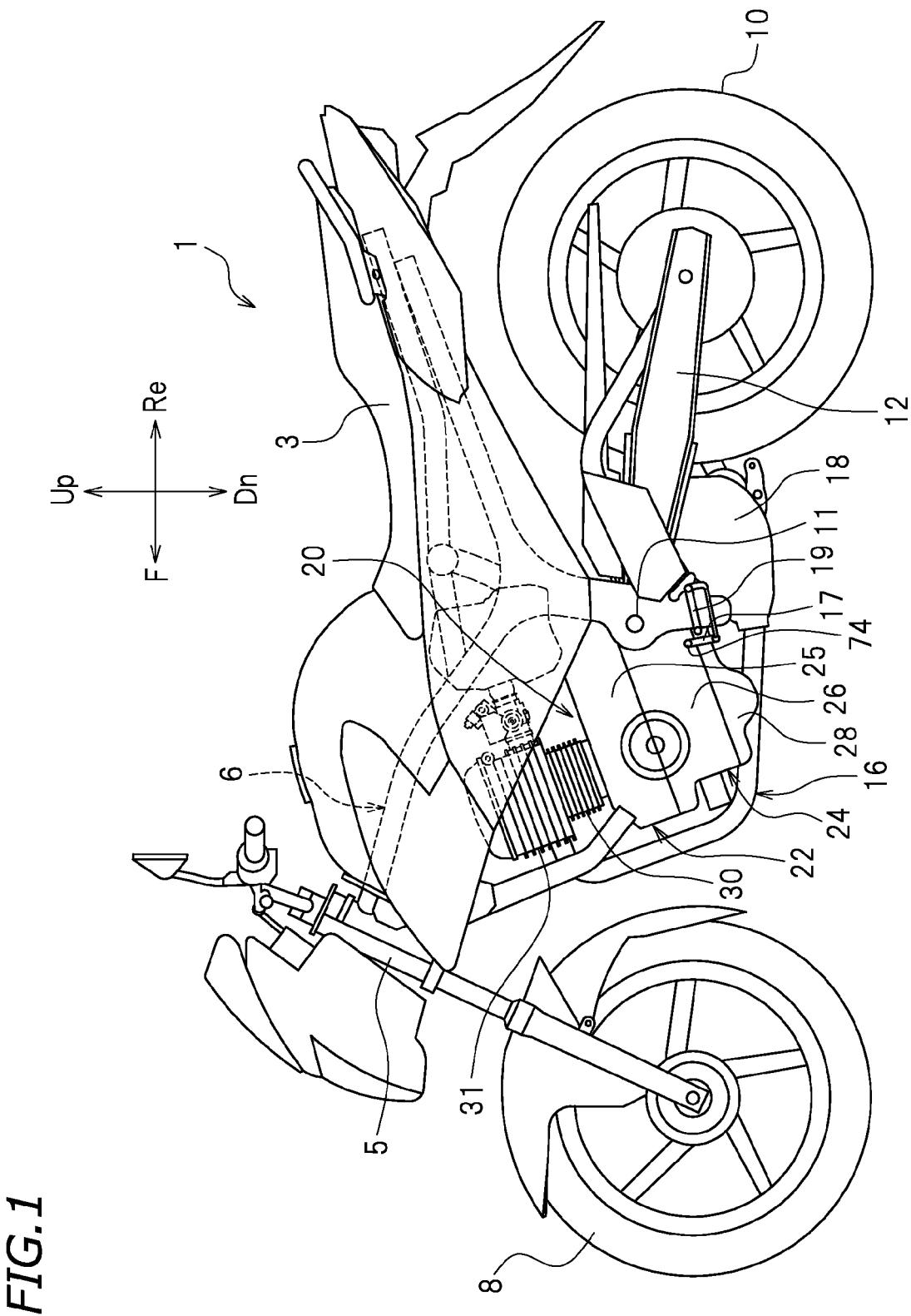
FIG. 1 is a left side view illustrating a motorcycle according to a first embodiment of the present invention.

Hereinafter, embodiments of the present invention will be described. As illustrated in FIG. 1, a straddle-type vehicle according to the present embodiment is a motorcycle 1. The motorcycle 1 is not limited to any particular type of motorcycle, but may be any type of motorcycle such as a "scooter-type", "moped-type", "off-road" or "street" motorcycle, for example. The straddle-type vehicle according to the present invention is not limited to a motorcycle, but may be an ATV (All Terrain Vehicle) or a four-wheel buggy, for example. As used herein, the term "straddle-type vehicle" refers to a vehicle that a rider straddles when getting on the vehicle.

In the following description, unless otherwise noted, the terms "front", "rear", "right", "left", "up" and "down" refer to front, rear, right, left, up and down with respect to a rider sitting on a seat 3 of the motorcycle 1, respectively. The terms "up" and "down" refer to a vertically upward direction and a vertically downward direction when the motorcycle 1 is brought to a stop on a horizontal plane, respectively. Reference signs "F", "Re", "R", "L", "Up" and "Dn" in the drawings represent front, rear, right, left, up and down, respectively. The above-mentioned directions are also used to describe components of a power unit 20. Specifically, the terms "front", "rear", "right", "left", "up" and "down" used to describe the power unit 20 installed on the motorcycle 1 refer to front, rear, right, left, up and down with respect to the rider, respectively.

As illustrated in FIG. 1, the motorcycle 1 may include: a head pipe 5; a body frame 6 fixed to the head pipe 5; a front wheel 8; and a rear wheel 10. A front end portion of a rear arm 12 is connected to a rear portion of the body frame 6 via a pivot shaft 11. The rear wheel 10 is rotatably supported by a rear end portion of the rear arm 12.

The motorcycle 1 may include the power unit 20. The power unit 20 is supported by the body frame 6 so as not to be swingable. The power unit 20 may include an engine 22 that is an internal combustion engine.

The engine 22 may include a crankcase 24, a cylinder body 30, and a cylinder head 31. The cylinder body 30 extends upward from a front portion of the crankcase 24. The cylinder head 31 is disposed on the cylinder body 30 and connected to the cylinder body 30.

Figure 2:
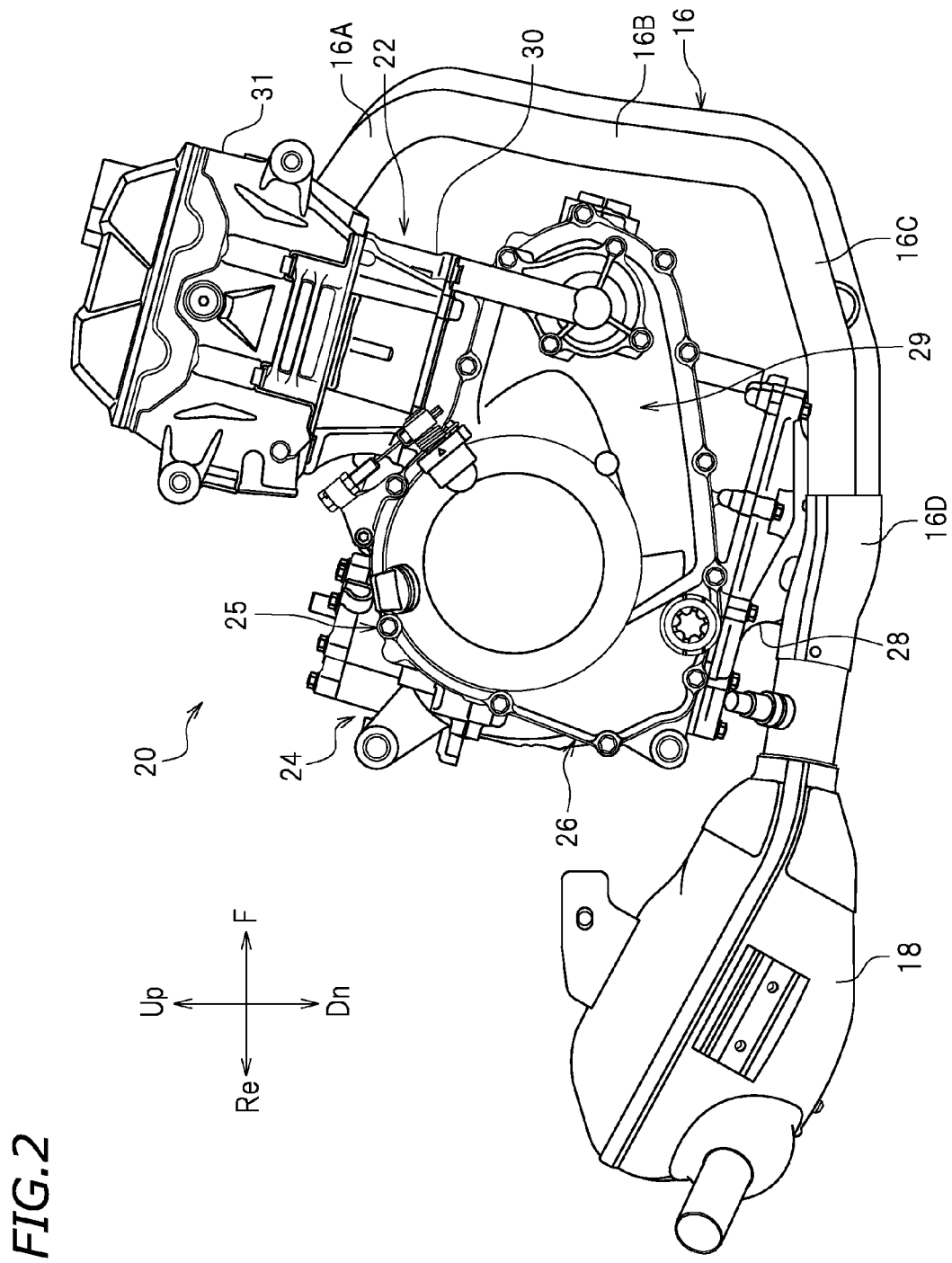
FIG. 2 is aright side view illustrating a power unit according to the first embodiment of the present invention.
Figure 3:
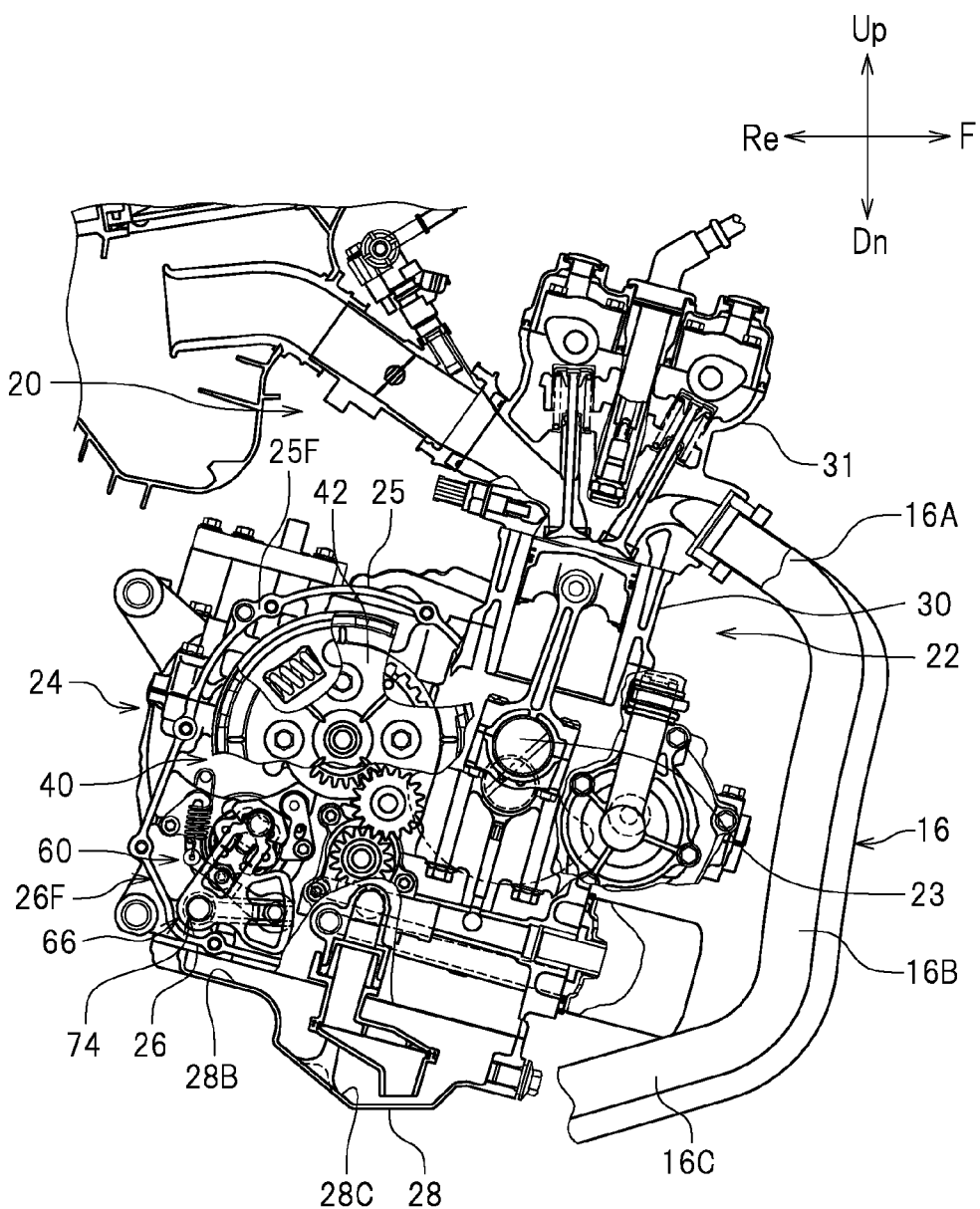
FIG. 3 is a cross-sectional view illustrating the power unit according to the first embodiment of the present invention.

The crankcase 24 may include an upper crankcase 25, and a lower crankcase 26 located under the upper crankcase 25. An oil pan 28 is disposed under the lower crankcase 26. The oil pan 28 collects oil that has flowed through the power unit 20. The lower crankcase 26 and the oil pan 28 are connected to each other. As illustrated in FIG. 2, a cover 29 is attached to a lateral portion of the crankcase 24. As illustrated in FIG. 3, the upper crankcase 25 may include a frame portion 25F to which the cover 29 (see FIG. 2) is attached when viewed in an axial direction of a shift shaft 74 (which will be described below). The lower crankcase 26 may include a frame portion 26F to which the cover 29 is attached when viewed in the axial direction of the shift shaft 74. The frame portion 26F is located higher than the oil pan 28.

The engine 22 may further include a crankshaft 23. The crankshaft 23 is disposed inside the crankcase 24.

Figure 4:
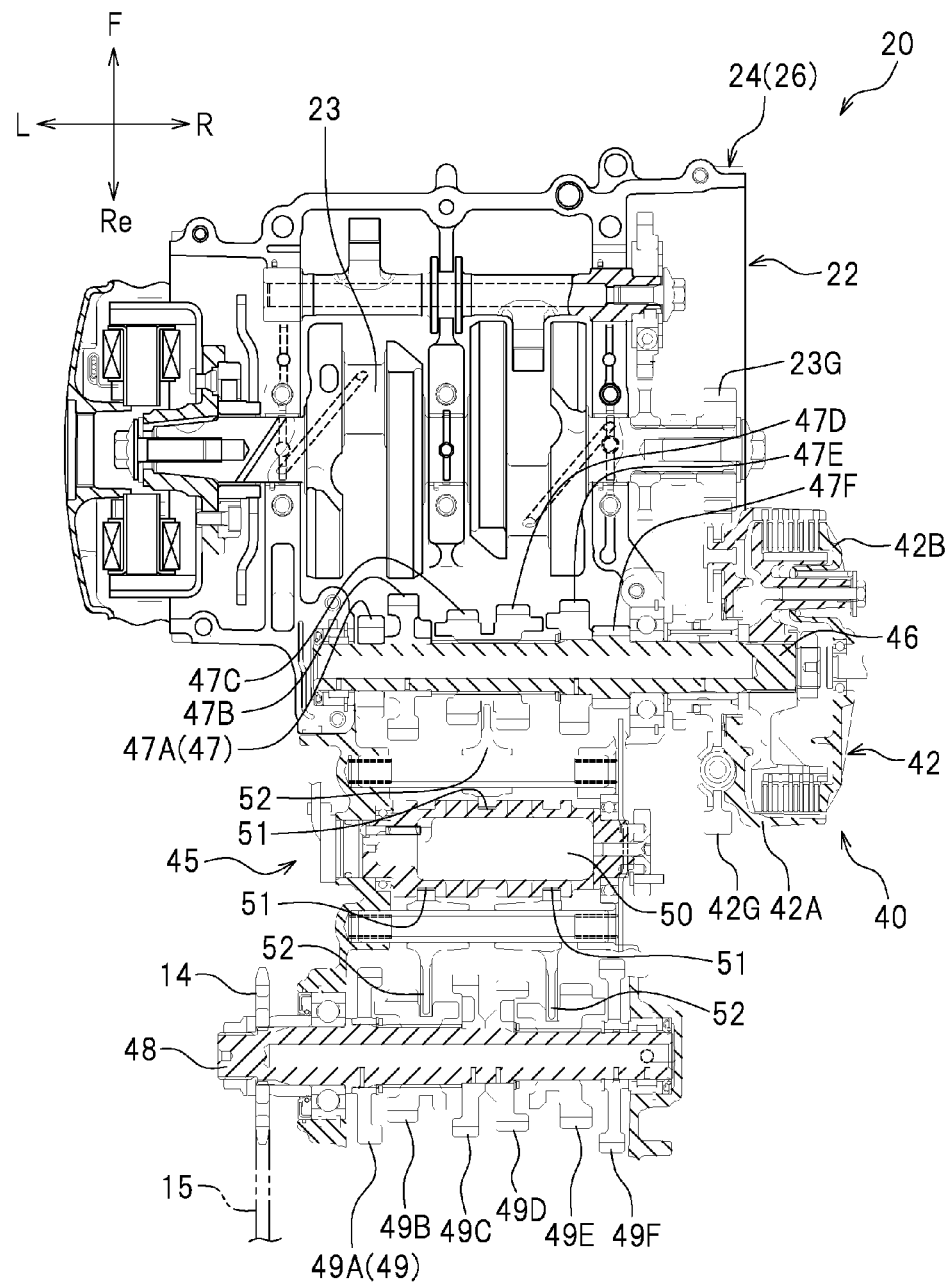
FIG. 4 is a cross-sectional view illustrating the power unit according to the first embodiment of the present invention.

The power unit 20 may include a transmission 40. The transmission 40 is disposed inside the crankcase 24. As illustrated in FIG. 4, the transmission 40 may include: a clutch 42 to which an engine torque of the crankshaft 23 is transmitted; and a transmission mechanism 45. The transmission mechanism 45 is a "dog clutch type" transmission.

The transmission mechanism 45 may include a main shaft 46, main shaft gears 47A to 47F, a drive shaft 48, and drive shaft gears 49A to 49F. Note that in the following description, the main shaft gears 47A to 47F may each be referred to as a "main shaft gear 47", and the drive shaft gears 49A to 49F may each be referred to as a "drive shaft gear 49".

The clutch 42 is a single plate or multi-plate friction clutch. It is to be noted that the clutch 42 is not limited to any particular type of clutch, but may be any clutch other than a friction clutch. The clutch 42 transmits or interrupts the engine torque. The clutch 42 is disposed inside the crankcase 24. The clutch 42 may include a clutch housing 42A and a clutch boss 42B. The clutch housing 42A is provided with a primary gear 42G. The primary gear 42G intermeshes with a crank gear 23G fixed to the crankshaft 23. Therefore, the clutch housing 42A is connected to the crankshaft 23.

The main shaft 46 is disposed in parallel or substantially in parallel with the crankshaft 23. The main shaft 46 is located rearward relative to the crankshaft 23. The main shaft 46 is fixed to the clutch boss 42B. The main shaft 46 rotates together with the clutch boss 42B of the clutch 42. The main shaft gears 47A to 47F are provided on the main shaft 46. The main shaft gears 47A to 47F rotate together with the main shaft 46. The main shaft gears 47A, 47B, 47E and 47F are arranged so as not to be movable in an axial direction of the main shaft 46. The main shaft gears 47C and 47D are arranged so as to be movable in the axial direction of the main shaft 46.

The drive shaft 48 is disposed in parallel or substantially in parallel with the main shaft 46. The drive shaft 48 is located rearward relative to the main shaft 46. The drive shaft gears 49A to 49F are provided on the drive shaft 48. The drive shaft gears 49A to 49F rotate together with the drive shaft 48. The drive shaft gears 49A to 49F are arranged so that the drive shaft gears 49A to 49F intermesh with the main shaft gears 47A to 47F, respectively. The drive shaft gears 49A, 49C, 49D and 49F are arranged so as not to be movable in an axial direction of the drive shaft 48. The drive shaft gears 49B and 49E are arranged so as to be movable in the axial direction of the drive shaft 48.

A sprocket 14 is attached to a left end portion of the drive shaft 48. The sprocket 14 and the rear wheel 10 (see FIG. 1) are connected to each other through a chain 15.

Figure 5A:
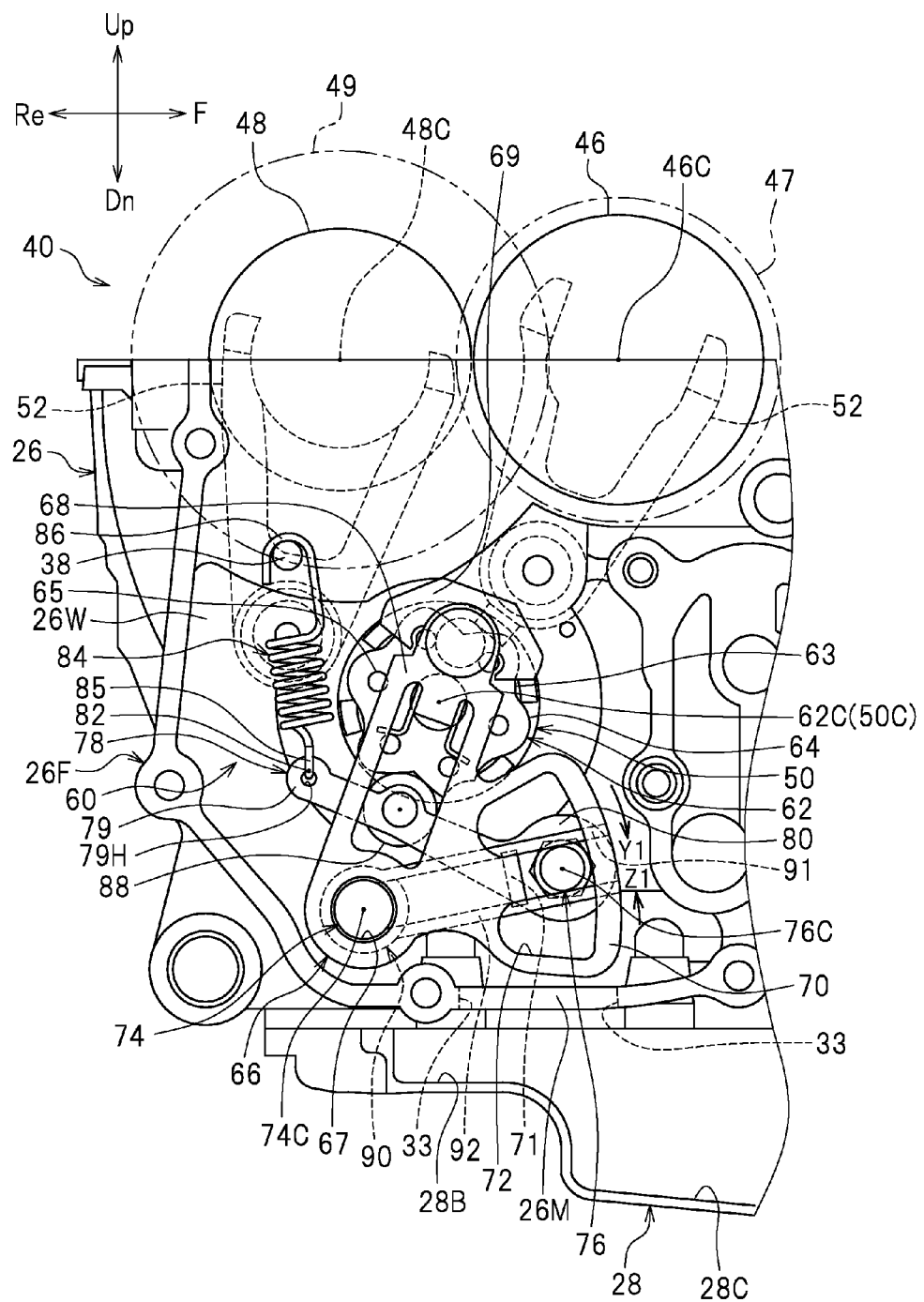
FIG. 5A is a side view illustrating a gear change mechanism according to the first embodiment of the present invention and its surrounding components in a state where a shift shaft is located at a first rotational position.

The transmission 40 may include a shift drum 50 and a shift fork 52. The shift drum 50 is provided with a plurality of grooves 51 whose axial positions change in accordance with an angle of rotation of the shift drum 50. The shift fork 52 engages with each groove 51. The shift fork 52 engages with the main shaft gears 47C and 47D and the drive shaft gear 49B and 49E. Upon rotation of the shift drum 50, the shift fork 52 moves in an axial direction of the shift drum 50. Then, the shift fork 52 moves at least one of the main shaft gears 47C and 47D and the drive shaft gear 49B and 49E. As a result, a combination of the main shaft gear 47 and the drive shaft gear 49 which intermesh with each other is changed, thus changing a transmission gear ratio. As illustrated in FIG. 5A, when viewed in the axial direction of the shift shaft 74 (which will be described below), a center 50C of the shift drum 50 is disposed lower than a center 46C of the main shaft 46.

Figure 6:
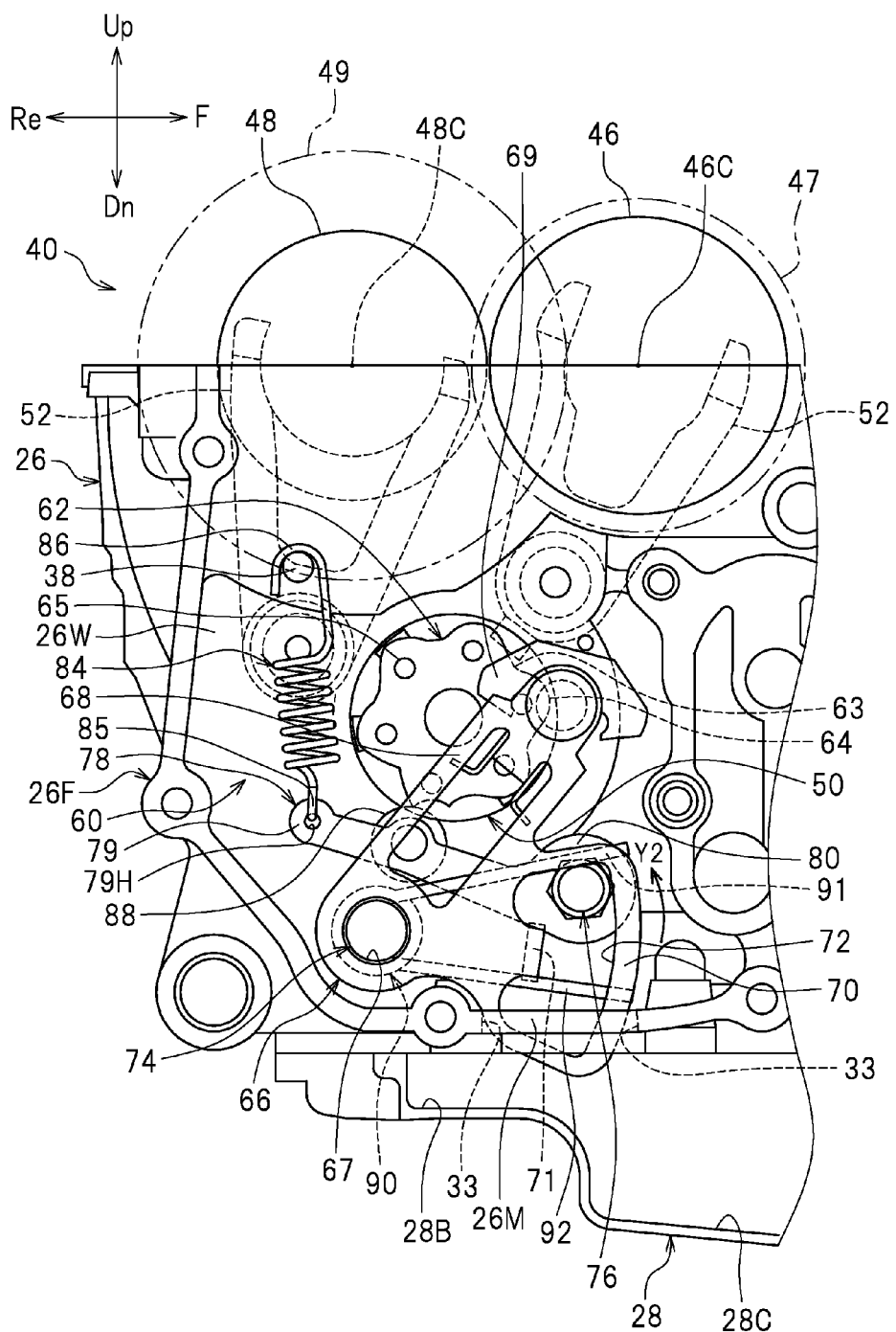
FIG. 6 is a side view illustrating the gear change mechanism according to the first embodiment of the present invention and its surrounding components in a state where the shift shaft is located at a second rotational position.
Figure 7:
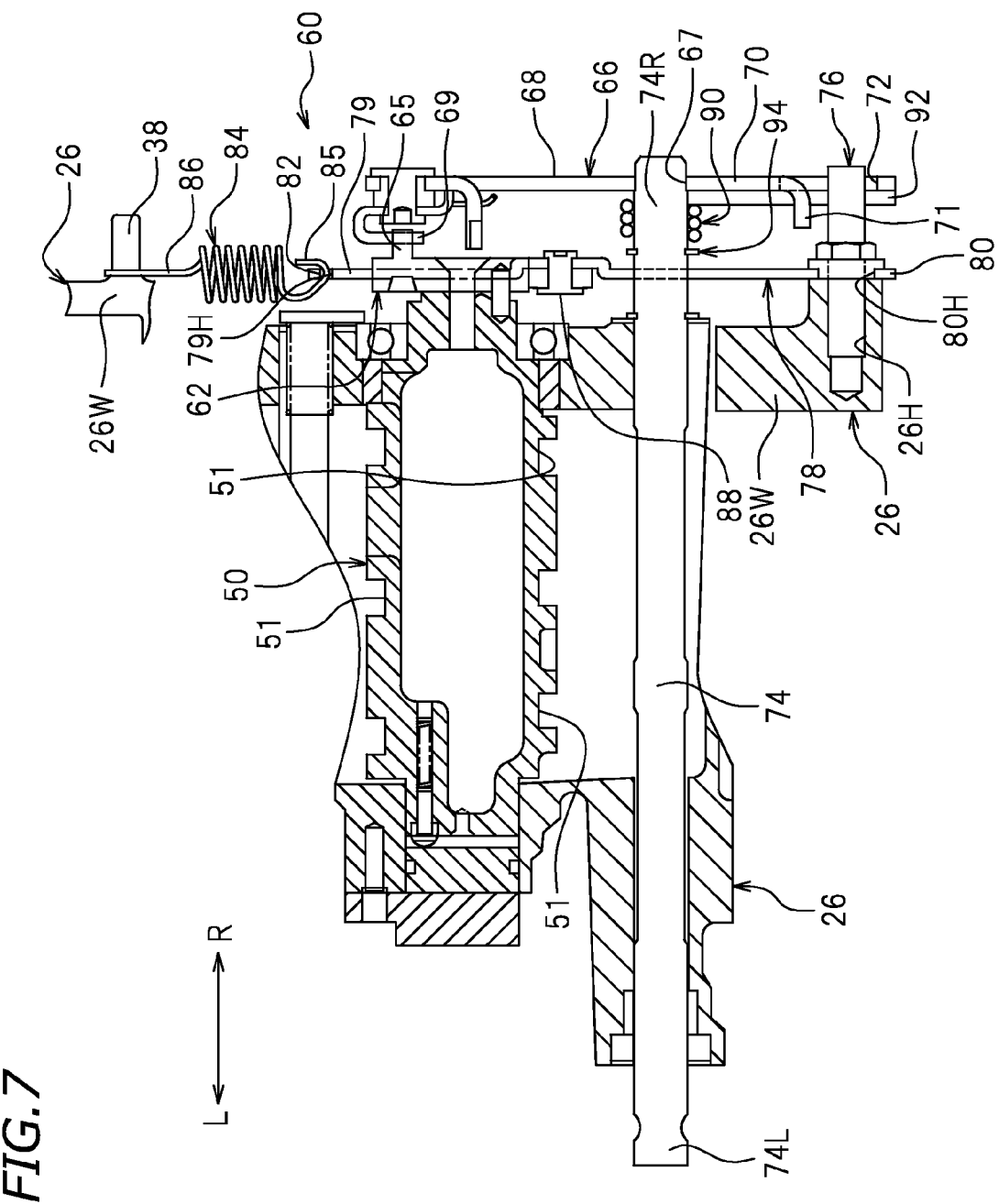
FIG. 7 is a cross-sectional view illustrating the gear change mechanism according to the first embodiment of the present invention and its surrounding components.

The transmission 40 may include the shift shaft 74. The shift shaft 74 is rotatable between a first rotational position (see FIG. 5A) and a second rotational position (see FIG. 6). The term "first rotational position" as used herein refers to a position at which no load of a torsion spring 90 is applied to a shift lever 66 (which will be described below) and a second arm 70 of the shift lever 66 is not in contact with a support shaft 76. The term "first rotational position" also refers to a position at which the second arm 70 of the shift lever 66 is not in contact with the support shaft 76 and a stopper roller 88 is engaged with a recessed portion 63 of a rotation plate 62. The term "second rotational position" as used herein refers to a position at which the load of the torsion spring 90 is applied to the shift lever 66 and the second arm 70 of the shift lever 66 is in contact with the support shaft 76. In the example shown in FIG. 6, the stopper roller 88 is not engaged with the recessed portion 63 of the rotation plate 62. But the stopper roller 88 is being engaged with the recessed portion 63 of the rotation plate 62 with the rotation of the rotation plate 62 forced by the elastic member 84. When the shift shaft 74 is located at the second rotational position, the stopper roller 88 may be engaged with the recessed portion 63 of the rotation plate 62, or the stopper roller 88 may not be engaged with the recessed portion 63 of the rotation plate 62. As illustrated in FIG. 7, the shift shaft 74 is supported by the lower crankcase 26. A left end portion 74L of the shift shaft 74 is located outward of the lower crankcase 26. A shift pedal 19 (see FIG. 1) is attached to the left end portion 74L of the shift shaft 74 via a link mechanism 17 (see FIG. 1). Alternatively, the shift pedal 19 may be directly attached to the left end portion 74L of the shift shaft 74. A right end portion 74R of the shift shaft 74 is inserted into a shift shaft insertion hole 67 of the shift lever 66 and thus fixed to the shift lever 66. As illustrated in FIG. 5A, when viewed in the axial direction of the shift shaft 74, a center 74C of the shift shaft 74 is disposed lower than the center 46C of the main shaft 46 and a center 48C of the drive shaft 48. When viewed in the axial direction of the shift shaft 74, the center 74C of the shift shaft 74 is located lower than a center 62C of the rotation plate 62. When viewed in the axial direction of the shift shaft 74, the center 74C of the shift shaft 74 is located rearward relative to the center 46C of the main shaft 46. When viewed in the axial direction of the shift shaft 74, the center 74C of the shift shaft 74 is located lower than the center 50C of the shift drum 50.

The transmission 40 may further include a gear change mechanism 60. The gear change mechanism 60 may include the rotation plate 62, the shift lever 66, the support shaft 76, a stopper lever 78, the stopper roller 88, and an elastic member 84.

The rotation plate 62 rotates together with the shift drum 50. The rotation plate 62 may include an outer peripheral surface 64 provided with a plurality of the recessed portions 63. The rotation plate 62 may further include a plurality of pins 65. In the present embodiment, the pins 65 are arranged at intervals of 60 degrees along an outer periphery of the rotation plate 62. The center 62C of the rotation plate 62 is located lower than the center 46C of the main shaft 46. The center 62C of the rotation plate 62 is located lower than the center 48C of the drive shaft 48. As illustrated in FIG. 7, the rotation plate 62 is fixed to a right end of the shift drum 50.

The shift lever 66 engages with the rotation plate 62. As illustrated in FIG. 5A, the shift lever 66 is provided with the shift shaft insertion hole 67 into which the shift shaft 74 is inserted. The shift lever 66 may include a first arm 68 and the second arm 70 which extend in two different directions at given angles with respect to a center of the shift shaft insertion hole 67. A front end portion of the first arm 68 is provided with a hook 69 that is engageable with the pin 65. As illustrated in FIG. 7, the hook 69 is located between the first arm 68 and the rotation plate 62. As illustrated in FIG. 5A, the second arm 70 is provided with an opening 72. When viewed in the axial direction of the shift shaft 74, the opening 72 and the support shaft 76 overlap with each other.

Figure 5B:
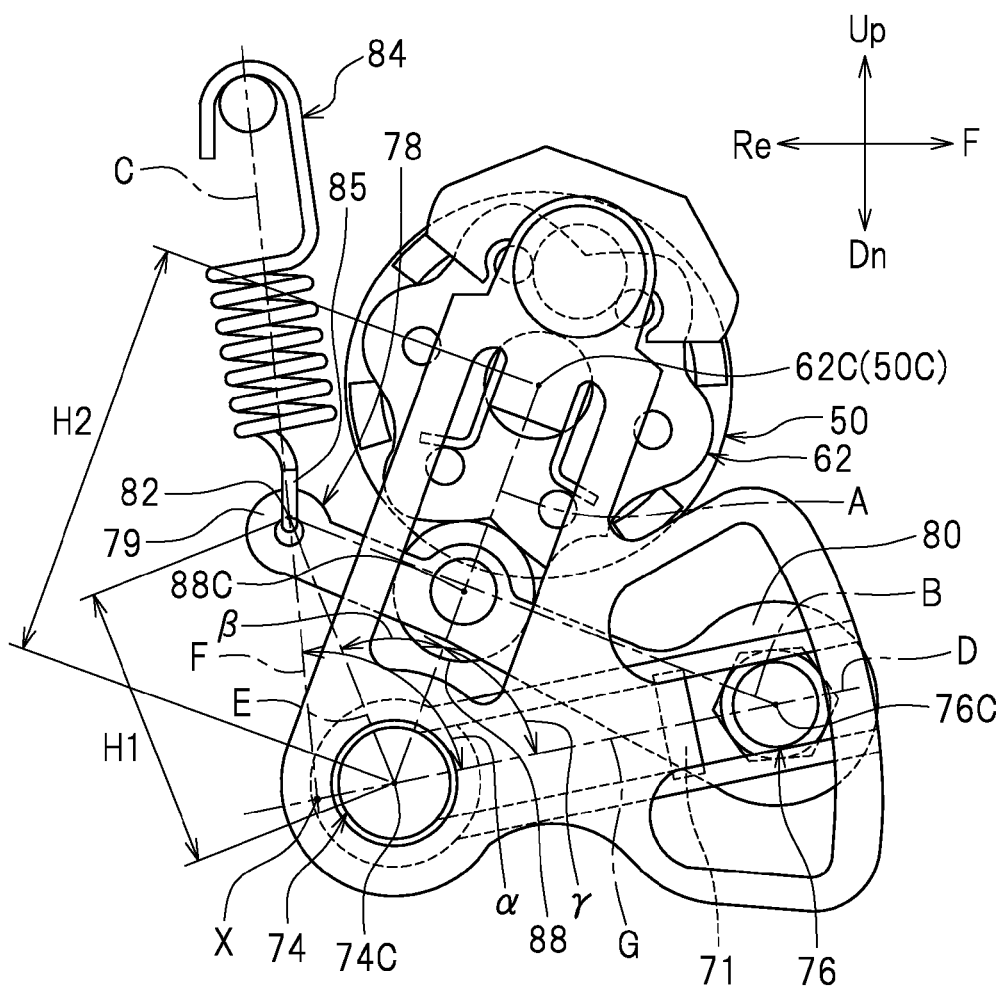
FIG. 5B is a side view illustrating the gear change mechanism according to the first embodiment of the present invention.

The second arm 70 is provided with a protrusion 71. As illustrated in FIG. 5B, when viewed in the axial direction of the shift shaft 74, the protrusion 71 extends in a direction that intersects a line (second line) D which passes through the center 74C of the shift shaft 74 and a center 76C of the support shaft 76. As illustrated in FIG. 7, the protrusion 71 extends toward the stopper lever 78. As illustrated in FIG. 5A, when viewed in the axial direction of the shift shaft 74, the shift lever 66 is disposed so that the shift lever 66 is located higher than a lower wall 26M (see also FIG. 9) of the frame portion 26F of the lower crankcase 26 when the shift shaft 74 is located at the first rotational position.

As illustrated in FIG. 7, the support shaft 76 is disposed in parallel or substantially in parallel with the shift drum 50. The support shaft 76 is in parallel or substantially in parallel with the shift shaft 74. A portion of the support shaft 76 is inserted into an insertion hole 26H of a partition wall 26W of the lower crankcase 26 and thus fixed to the lower crankcase 26. As illustrated in FIG. 5A, the support shaft 76 is located forward relative to the center 74C of the shift shaft 74. The support shaft 76 is located forward relative to the protrusion 71 of the shift lever 66.

The stopper lever 78 may include a first end portion 79 and a second end portion 80. As illustrated in FIG. 7, the second end portion 80 is provided with a support shaft insertion hole 80H. The support shaft 76 is inserted through the support shaft insertion hole 80H. As illustrated in FIG. 5A, the second end portion 80 is rotatably supported by the support shaft 76. The stopper lever 78 is rotatable around the support shaft 76. The first end portion 79 is provided with an insertion hole 79H through which a first engagement end portion 85 of the elastic member 84 (which will be described below) is inserted. As illustrated in FIG. 5B, when viewed in the axial direction of the shift shaft 74, the stopper lever 78 is disposed to intersect a first line segment A that connects the center 74C of the shift shaft 74 to the center 62C of the rotation plate 62. As illustrated in FIG. 5A, when viewed in the axial direction of the shift shaft 74, the stopper lever 78 is disposed so that the stopper lever 78 is located higher than the lower wall 26M of the frame portion 26F of the lower crankcase 26 when the shift shaft 74 is located at the first rotational position.

The stopper roller 88 is provided in the stopper lever 78. The stopper roller 88 is provided between the first and second end portions 79 and 80 of the stopper lever 78. The stopper roller 88 engages with the recessed portion 63 of the rotation plate 62 when the shift shaft 74 is located at the first rotational position. As illustrated in FIG. 5B, when viewed in the axial direction of the shift shaft 74, the stopper roller 88 is disposed on a second line segment B that connects the center 76C of the support shaft 76 and a connection 82 between the first end portion 79 of the stopper lever 78 and the first engagement end portion 85 of the elastic member 84 to each other. When the stopper roller 88 is engaged with the recessed portion 63 of the rotation plate 62, the second line segment B is separate from the rotation plate 62 as viewed in the axial direction of the shift shaft 74. When the stopper roller 88 is engaged with the recessed portion 63 of the rotation plate 62, the stopper roller 88 is disposed on the first line segment A as viewed in the axial direction of the shift shaft 74.

The elastic member 84 applies a force to the stopper lever 78 so as to press the stopper roller 88 against the recessed portion 63 of the rotation plate 62. As illustrated in FIG. 5A, the elastic member 84 may include the first and second engagement end portions 85 and 86. The first engagement end portion 85 engages with the first end portion 79 of the stopper lever 78. The first engagement end portion 85 is inserted through the insertion hole 79H of the first end portion 79. The second engagement end portion 86 engages with a boss 38 of the lower crankcase 26 (which will be described below). The elastic member 84 is disposed rearward relative to the shift drum 50. The elastic member 84 is disposed higher than the shift shaft 74. The elastic member 84 is disposed lower than the main shaft 46 and the drive shaft 48. The elastic member 84 according to the present embodiment is a tension spring. It is to be noted that the elastic member 84 is not limited to a tension spring but may be a compression spring or rubber, for example.

Figure 8:
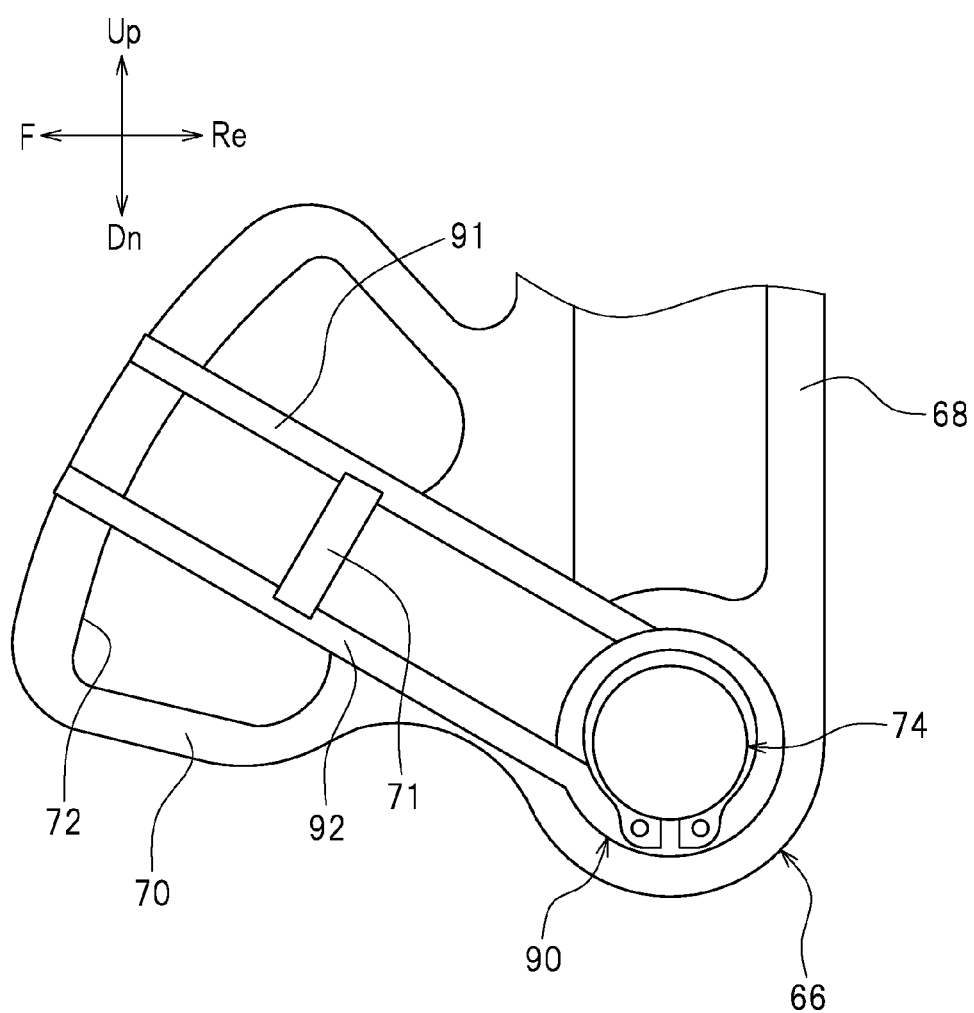
FIG. 8 is a left side view illustrating a shift lever according to the first embodiment of the present invention.

As illustrated in FIG. 7, the gear change mechanism 60 may include the torsion spring 90. The torsion spring 90 is attached to the right end portion 74R of the shift shaft 74. The torsion spring 90 and the stopper lever 78 are deviated from each other in the axial direction of the shift shaft 74. The torsion spring 90 is located leftward of the shift lever 66. The torsion spring 90 is located rightward of the stopper lever 78. As illustrated in FIG. 5A, the torsion spring 90 may include a first arm portion 91 and a second arm portion 92 which are adjacent to each other, with the shift shaft 74 interposed therebetween. The support shaft 76 is disposed between the first and second arm portions 91 and 92. The first and second arm portions 91 and 92 are engageable with the support shaft 76. As illustrated in FIG. 8, the protrusion 71 of the shift lever 66 is disposed between the first and second arm portions 91 and 92. As illustrated in FIG. 5A, when viewed in the axial direction of the shift shaft 74, portions of the first and second arm portions 91 and 92 overlap the second arm 70 of the shift lever 66. The first and second arm portions 91 and 92 are engageable with the protrusion 71 of the shift lever 66.

As illustrated in FIG. 7, a stopper 94 that restricts axial movement of the torsion spring 90 is attached to the right end portion 74R of the shift shaft 74. The stopper 94 is located rightward of the stopper lever 78. The stopper 94 is located leftward of the torsion spring 90.

Figure 9:
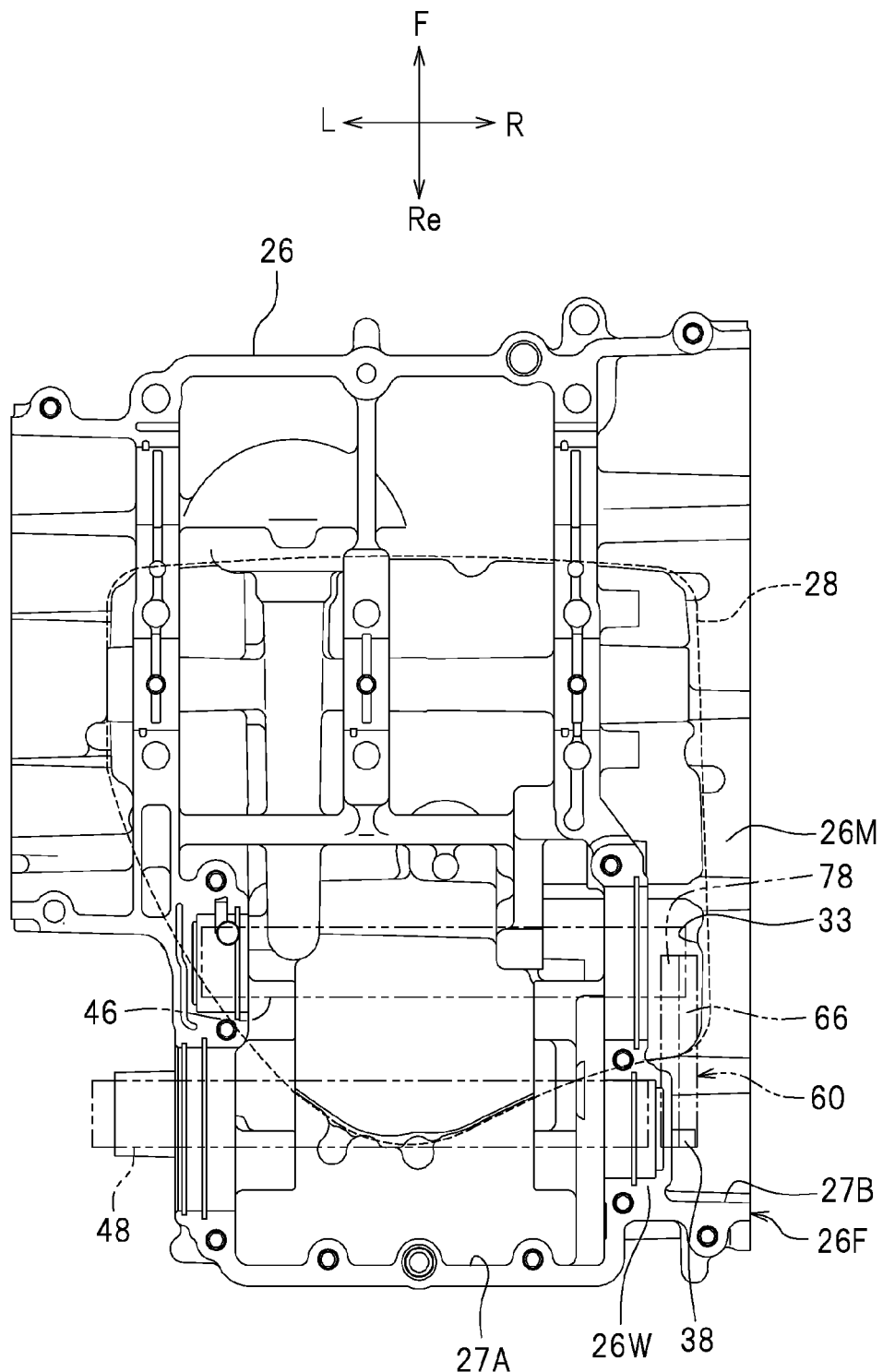
FIG. 9 is a plan view of a lower crankcase according to the first embodiment of the present invention.

As illustrated in FIG. 9, the lower crankcase 26 may include: a first chamber 27A that houses the main shaft 46 and the drive shaft 48; and a second chamber 27B that houses the gear change mechanism 60. The partition wall 26W serves as a partition between the first and second chambers 27A and 27B. The partition wall 26W is provided with the boss 38. The partition wall 26W and the boss 38 are cast in one piece. The boss 38 is located in the second chamber 27B. As illustrated in FIG. 7, the boss 38 extends from the partition wall 26W in a direction perpendicular or substantially perpendicular to an axial direction of the elastic member 84. The boss 38 is disposed in parallel or substantially in parallel with the shift shaft 74. The boss 38 is engaged with the second engagement end portion 86 of the elastic member 84. As illustrated in FIG. 5A, the boss 38 is disposed to overlap the drive shaft gears 49 when viewed in the axial direction of the main shaft 46. Alternatively, the boss 38 may overlap the main shaft 46, the main shaft gears 47 and/or the drive shaft 48 when viewed in the axial direction of the main shaft 46.

As illustrated in FIG. 5A, the frame portion 26F of the lower crankcase 26 may include the lower wall 26M located below the shift lever 66 and the stopper lever 78 and above the oil pan 28. As illustrated in FIG. 9, the lower wall 26M is provided with an opening 33. In a plan view, a portion of the shift lever 66 overlaps the opening 33. In the plan view, a portion of the stopper lever 78 overlaps the opening 33.

Figure 10:
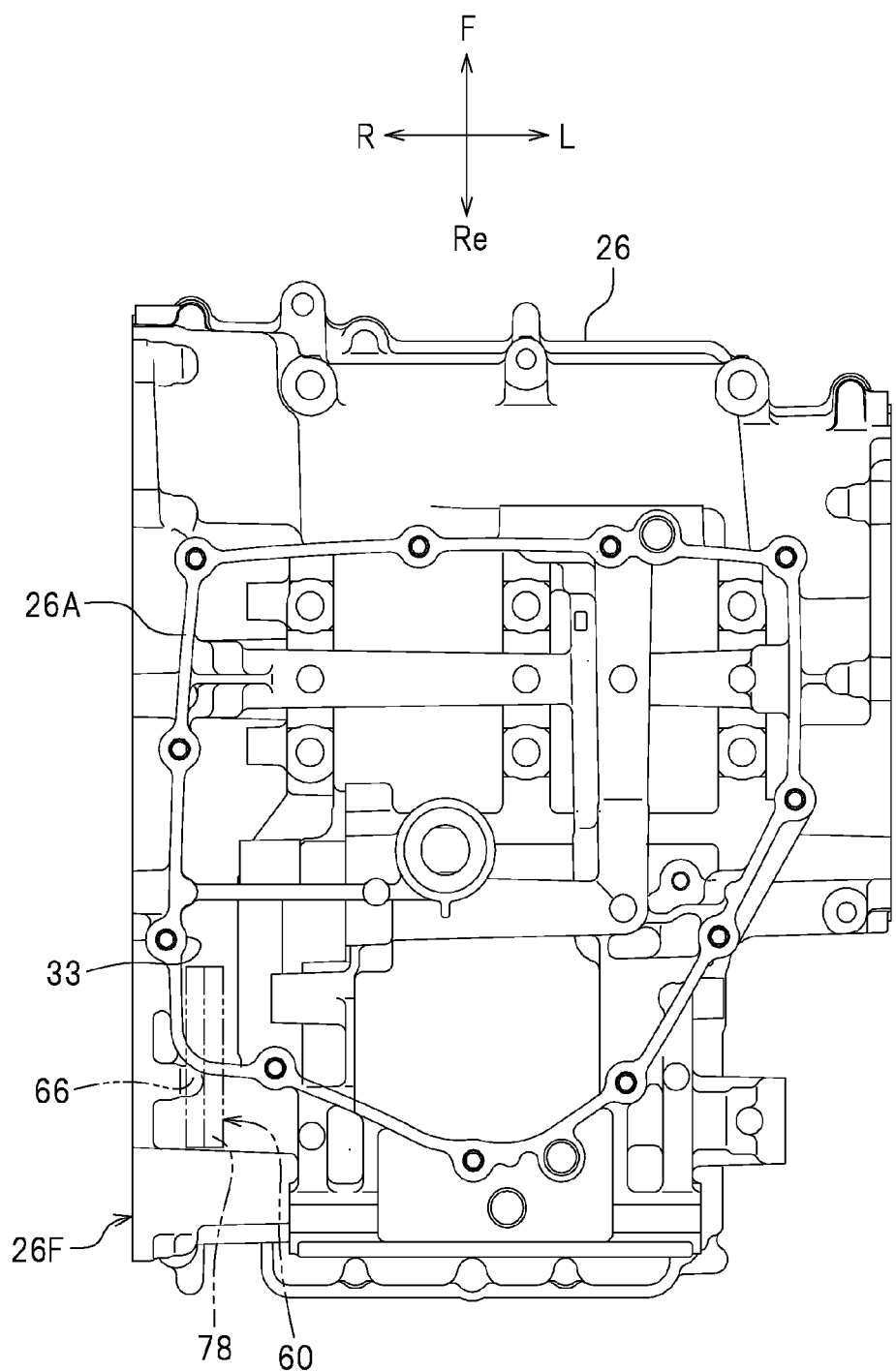
FIG. 10 is a bottom view of the lower crankcase according to the first embodiment of the present invention.
Figure 11A:
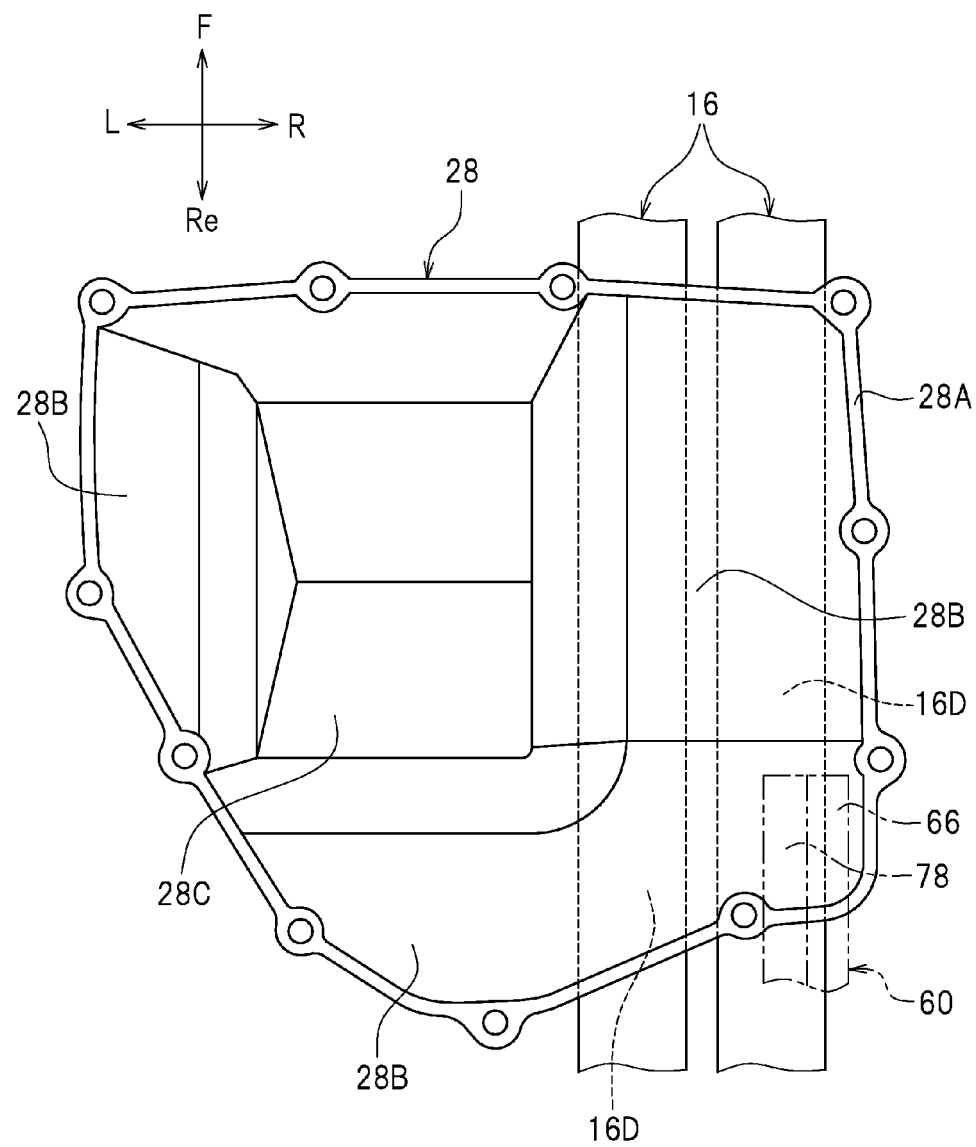
FIG. 11A is a plan view of an oil pan according to the first embodiment of the present invention.
Figure 11B:
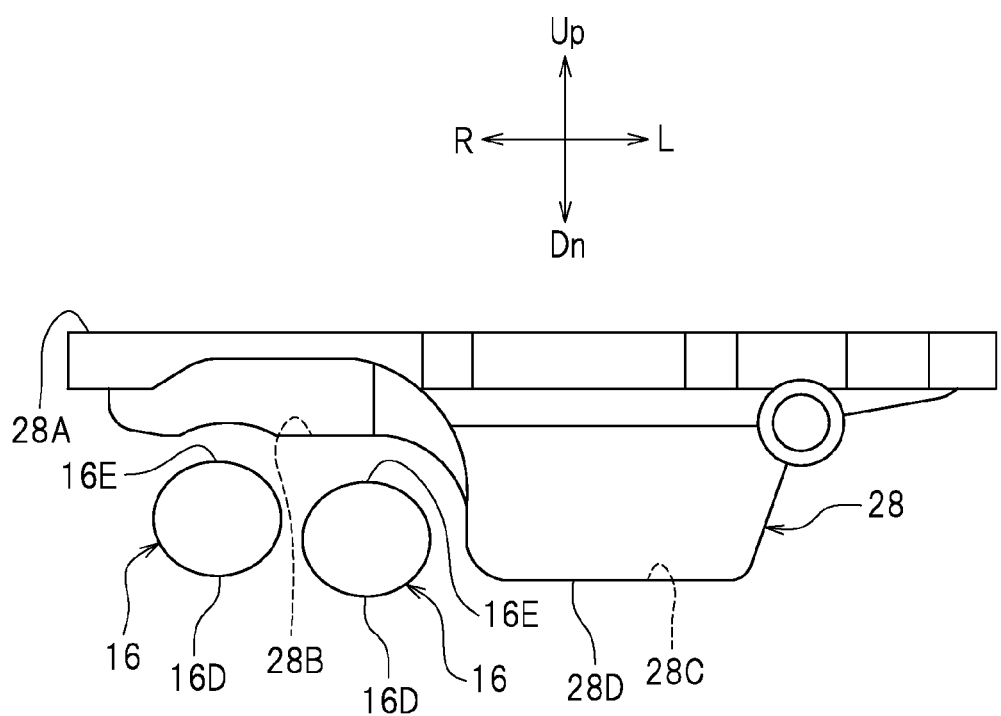
FIG. 11B is a front view of the oil pan according to the first embodiment of the present invention.

As illustrated in FIG. 10, the lower crankcase 26 may include a lower surface 26A that faces an upper surface 28A (see FIGS. 11A and 11B) of the oil pan 28 (see FIGS. 11A and 11B).

As illustrated in FIGS. 11A and 11B, the oil pan 28 may include the upper surface 28A that faces the lower surface 26A (see FIG. 10) of the lower crankcase 26 (see FIG. 10). The oil pan 28 may include: a first lower wall 28B; and a second lower wall 28C recessed downward from the first lower wall 28B. In the plan view, a portion of the shift lever 66 and the first lower wall 28B of the oil pan 28 overlap with each other. In the plan view, a portion of the stopper lever 78 and the first lower wall 28B of the oil pan 28 overlap with each other. The first lower wall 28B has an area larger than that of the second lower wall 28C.

As illustrated in FIG. 1, the motorcycle 1 may include: an exhaust pipe 16 through which exhaust gas discharged from the engine 22 flows; and a silencer 18. The exhaust pipe 16 is connected to the engine 22. Specifically, as illustrated in FIG. 2, the exhaust pipe 16 may include: a first portion 16A that extends obliquely downward and forward from the cylinder head 31; a second portion 16B that extends downward from the first portion 16A; a third portion 16C that extends obliquely downward and rearward from the second portion 16B; and a fourth portion 16D that extends rearward from the third portion 16C. The fourth portion 16D is disposed lower than the lower crankcase 26. The silencer 18 is connected to a rear end portion of the exhaust pipe 16.

As illustrated in FIG. 11A, the fourth portion 16D of the exhaust pipe 16 overlaps the first lower wall 28B of the oil pan 28 in the plan view. As illustrated in FIG. 11B, the fourth portion 16D of the exhaust pipe 16 is disposed below the first lower wall 28B of the oil pan 28. An upper end 16E of the fourth portion 16D is located higher than a lower end 28D of the second lower wall 28C of the oil pan 28.

Next, how the gear change mechanism 60 operates will be described. FIG. 5A illustrates the gear change mechanism 60 and its surrounding components, with the shift shaft 74 located at the first rotational position. FIG. 6 illustrates the gear change mechanism 60 and its surrounding components, with the shift shaft 74 located at the second rotational position. When the shift pedal 19 (see FIG. 1) is operated by the rider, the shift shaft 74 rotates from the first rotational position toward the second rotational position, so that the shift lever 66 rotates in a direction indicated by an arrow Y1 in FIG. 5A. With the rotation of the shift lever 66, the hook 69 of the shift lever 66 and the pin 65 of the rotation plate 62 engage with each other. The pin 65 receives a force from the hook 69, thus rotating the rotation plate 62 and the shift drum 50. In this case, the first arm portion 91 of the torsion spring 90 engages with the support shaft 76. Therefore, the first arm portion 91 does not rotate in the direction indicated by the arrow Y1 in FIG. 5A. The second arm portion 92 of the torsion spring 90 is in engagement with the protrusion 71. Hence, with the rotation of the shift lever 66, the second arm portion 92 moves in the direction indicated by the arrow Y1 in FIG. 5A. When the shift lever 66 continues to rotate in the direction indicated by the arrow Y1 in FIG. 5A, the second arm 70 comes into contact with the support shaft 76 (see FIG. 6). As a result, further rotation of the shift lever 66 in the direction indicated by the arrow Y1 is restricted.

As illustrated in FIG. 6, when the shift shaft 74 is located at the second rotational position, a portion of the second arm 70 of the shift lever 66 is located lower than the lower wall 26M of the frame portion 26F of the lower crankcase 26 and inside the oil pan 28 as viewed in the axial direction of the shift shaft 74. In other words, a portion of the second arm 70 moves into the oil pan 28 through the opening 33 in the lower wall 26M of the frame portion 26F of the lower crankcase 26. When the shift shaft 74 is located at the second rotational position, a portion of the opening 72 of the shift lever 66 overlaps the lower wall 26M of the frame portion 26F as viewed in the axial direction of the shift shaft 74. Upon rotation of the shift drum 50 and completion of a speed change, a restoring force of the torsion spring 90 causes the second arm portion 92 and the protrusion 71 to move in a direction indicated by an arrow Y2 in FIG. 6. Thus, the shift lever 66 also moves in the direction indicated by the arrow Y2 in FIG. 6. As a result, the shift lever 66 returns to the first rotational position from the second rotational position, and the hook 69 of the shift lever 66 and the pin 65 of the rotation plate 62 are disengaged from each other. Note that when the shift pedal 19 (see FIG. 1) is operated by the rider, the shift shaft 74 may rotate so that the shift lever 66 moves in a direction indicated by an arrow Z1 in FIG. 5A. As a result, the shift drum 50 is rotated to perform a speed change.

As illustrated in FIG. 5B, when a point of intersection of a line (first line) C that extends along an axis of the elastic member 84 and the line (second line) D that passes through the center 74C of the shift shaft 74 and the center 76C of the support shaft 76 is defined as a first point X as viewed in the axial direction of the shift shaft 74, an angle α formed between a line segment (third line segment) F that connects the connection 82 to the first point X and a line segment (fourth line segment) G that connects the first point X to the center 76C of the support shaft 76 is 90 degrees or less. When viewed in the axial direction of the shift shaft 74, an angle β formed between a line segment (fifth line segment) E that connects the connection 82 to the center 74C of the shift shaft 74 and the first line segment A that connects the center 74C of the shift shaft 74 to the center 62C of the rotation plate 62 is equal to or smaller than an angle 7 formed between the line D that passes through the center 74C of the shift shaft 74 and the center 76C of the support shaft 76 and the first line segment A that connects the center 74C of the shift shaft 74 to the center 62C of the rotation plate 62. When viewed in the axial direction of the shift shaft 74, a distance H1 between the connection 82 and the center 74C of the shift shaft 74 is shorter than a distance H2 between the center 74C of the shift shaft 74 and the center 62C of the rotation plate 62.

As described above, in the power unit 20 according to the present embodiment, the shift lever 66 is disposed so that when the shift shaft 74 is located at the second rotational position, a portion of the second arm 70 of the shift lever 66 is located lower than the lower wall 26M of the frame portion 26F of the lower crankcase 26 and inside the oil pan 28 as illustrated in FIG. 6. Therefore, a layout of the shift lever 66, which is a component of the gear change mechanism 60, is performed without the constraint that the shift lever 66 must always be located higher than the lower wall 26M of the frame portion 26F of the lower crankcase 26. Hence, the gear change mechanism 60 and the shift drum 50 are disposed at lower positions, thus lowering a center of gravity of the power unit 20. Moreover, layout flexibility of the gear change mechanism 60 is increased.

As illustrated in FIG. 6, when the shift shaft 74 is located at the second rotational position, a portion of the second arm 70 of the shift lever 66 is positioned inside the oil pan 28 through the opening 33 provided in the lower wall 26M. As long as an area of the opening 33 provided in the lower wall 26M is kept to a minimum necessary to allow passage of a portion of the second arm 70 through the opening 33, a sufficient area of the lower wall 26M of the lower crankcase 26 is ensured, thus maintaining rigidity of the lower crankcase 26 at a high level. In other words, rigidity of the frame portion 26F is maintained at a high level.

As illustrated in FIG. 5A, when the shift shaft 74 does not rotate and is located at the first rotational position, the entire shift lever 66 and the entire stopper lever 78 are located higher than the lower wall 26M of the frame portion 26F of the lower crankcase 26. As a result, assembly of the gear change mechanism 60 is facilitated.

As illustrated in FIG. 11A, the fourth portion 16D, which is a portion of the exhaust pipe 16, overlaps with the first lower wall 28B of the oil pan 28 in the plan view. As illustrated in FIG. 11B, the upper end 16E of the fourth portion 16D is located higher than the lower end 28D of the second lower wall 28C of the oil pan 28. Hence, the fourth portion 16D is disposed at a relatively high position while the fourth portion 16D is located below the oil pan 28. As a result, a banking angle of the motorcycle 1 is ensured. The first lower wall 28B of the oil pan 28 is disposed below a portion of the shift lever 66 and a portion of the stopper lever 78. Thus, the oil pan 28 according to the present embodiment has a large area in the plan view. Consequently, a volume of the oil pan 28 is ensured even though the fourth portion 16D of the exhaust pipe 16 is disposed below the first lower wall 28B.

As illustrated in FIG. 5A, in the present embodiment, the center 74C of the shift shaft 74 is located lower than the center 46C of the main shaft 46 and the center 50C of the shift drum 50. Thus, the shift shaft 74 is disposed at a relatively low position. As a result, when the shift pedal 19 is connected to the shift shaft 74 via the link mechanism 17, the link mechanism 17 is reduced in length.

Second Embodiment

Figure 12:
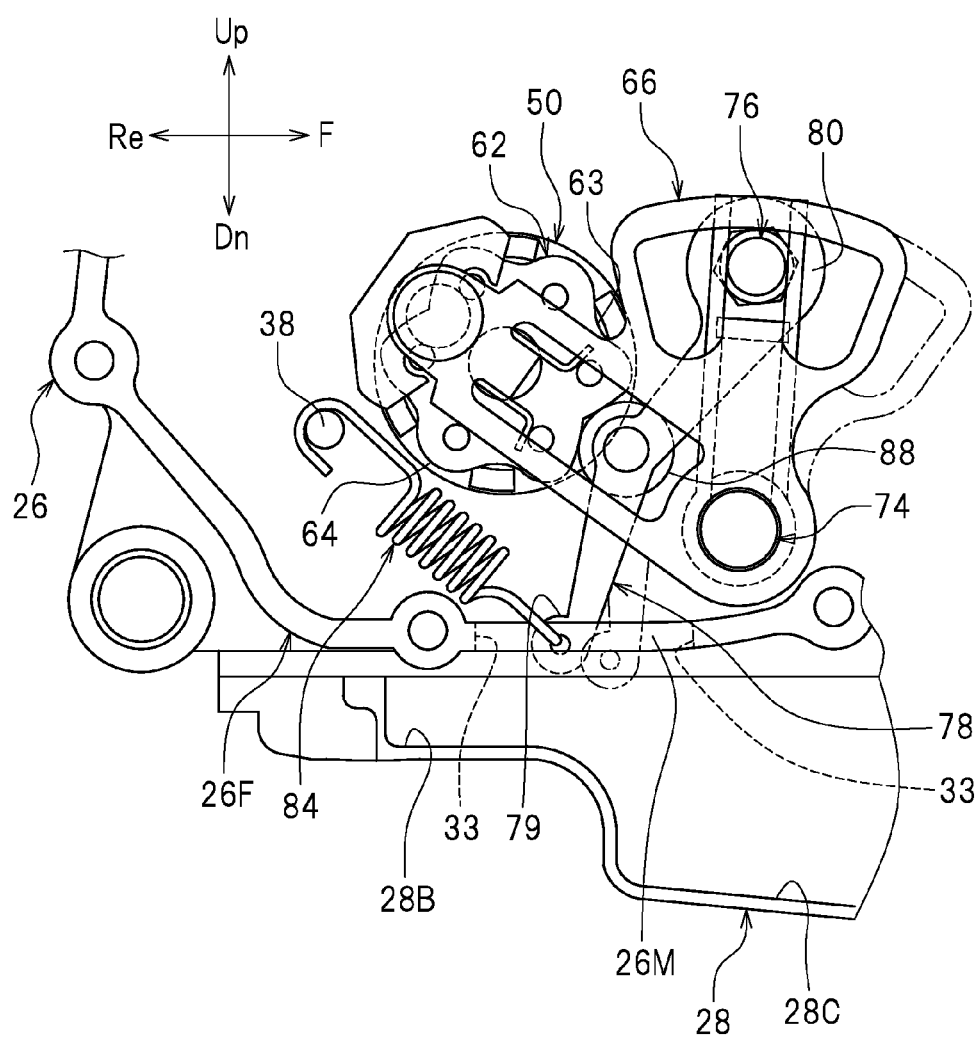
FIG. 12 is a side view illustrating a gear change mechanism according to a second embodiment of the present invention and its surrounding components.

Next, referring to FIG. 12, the gear change mechanism 60 according to a second embodiment of the present invention will be described. In FIG. 12, solid lines indicate the gear change mechanism 60 and its surrounding components, with the shift shaft 74 located at the first rotational position, and two-dot chain lines indicate the gear change mechanism 60, with the shift shaft 74 located at the second rotational position. In the following description, elements similar to those in the first embodiment are identified by the same reference signs as those used in the first embodiment, and description thereof will be omitted.

As illustrated in FIG. 12, when the shift shaft 74 is located at the first rotational position, the first end portion 79 of the stopper lever 78 overlaps the frame portion 26F of the lower crankcase 26 as viewed in the axial direction of the shift shaft 74. When the shift shaft 74 is located at the first rotational position, the first end portion 79 overlaps the lower wall 26M of the frame portion 26F of the lower crankcase 26 as viewed in the axial direction of the shift shaft 74. Alternatively, when the shift shaft 74 is located at the first rotational position, the first end portion 79 of the stopper lever 78 may be located higher than the frame portion 26F of the lower crankcase 26 or the lower wall 26M of the frame portion 26F of the lower crankcase 26 as viewed in the axial direction of the shift shaft 74. When the shift shaft 74 is located at the second rotational position, a portion of the first end portion 79 of the stopper lever 78 is located lower than the frame portion 26F of the lower crankcase 26 and inside the oil pan 28 as viewed in the axial direction of the shift shaft 74. When the shift shaft 74 is located at the second rotational position, a portion of the first end portion 79 of the stopper lever 78 is located lower than the lower wall 26M of the frame portion 26F of the lower crankcase 26 and inside the oil pan 28 as viewed in the axial direction of the shift shaft 74. In other words, a portion of the first end portion 79 of the stopper lever 78 moves into the oil pan 28 through the opening 33 in the lower wall 26M of the frame portion 26F of the lower crankcase 26. Alternatively, when the shift shaft 74 is located at the second rotational position, a portion of the first end portion 79 of the stopper lever 78 and a portion of the second arm 70 of the shift lever 66 may be located lower than the frame portion 26F of the lower crankcase 26 or the lower wall 26M of the frame portion 26F of the lower crankcase 26 and inside the oil pan 28 as viewed in the axial direction of the shift shaft 74.

As illustrated in FIG. 12, in the power unit 20 according to the present embodiment, the stopper lever 78 is disposed so that when the shift shaft 74 is located at the second rotational position, a portion of the first end portion 79 of the stopper lever 78 is located lower than the lower wall 26M of the frame portion 26F of the lower crankcase 26 and inside the oil pan 28. Therefore, a layout of the stopper lever 78, which is a component of the gear change mechanism 60, is performed without the constraint that the stopper lever 78 must always be located higher than the lower wall 26M of the frame portion 26F. Hence, the gear change mechanism 60 and the shift drum 50 are disposed at lower positions, thus lowering the center of gravity of the power unit 20. Furthermore, layout flexibility of the gear change mechanism 60 is increased.

The terms and expressions used herein are used for explanation purposes and should not be construed as being restrictive. It should be appreciated that the terms and expressions used herein do not eliminate any equivalents of features illustrated and mentioned herein, and allow various modifications falling within the claimed scope of the present invention. The present invention may be embodied in many different forms. The present disclosure is to be considered as providing examples of the principles of the present invention. These examples are described herein with the understanding that such examples are not intended to limit the present invention to embodiments described herein and/or illustrated herein. Hence, the present invention is not limited to the embodiments described herein. The present invention includes any and all embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

The invention claimed is:

1. A power unit, comprising:
a shift drum;
a rotation plate fixed to an end of the shift drum, to thereby rotate with the shift drum, the rotation plate including an outer peripheral surface having a plurality of recessed portions;
a shift lever configured to engage with the rotation plate;
a shift shaft fixed to the shift lever, and being rotatable between a first rotational position and a second rotational position;
a support shaft disposed substantially in parallel with the shift drum;
a stopper lever rotatably supported by the support shaft;
a stopper roller provided in the stopper lever, the stopper roller being configured to engage with one of the recessed portions of the rotation plate when the shift shaft is in the first rotational position;
an elastic member configured to engage with the stopper lever, so as to apply a force to the stopper lever to thereby press the stopper roller against the one recessed portion;
a crankcase housing the shift drum, the rotation plate, the shift lever, the support shaft, the stopper lever, the stopper roller, the elastic member, and at least a portion of the shift shaft; and
an oil pan disposed under the crankcase,
wherein the crankcase includes a frame portion that is located higher than the oil pan and to which a cover is attached when viewed in an axial direction of the shift shaft, and
wherein the shift lever and the stopper lever are so disposed that when the shift shaft is located at the second rotational position, at least one of a portion of the shift lever and a portion of the stopper lever is located lower than the frame portion of the crankcase and inside the oil pan as viewed in the axial direction of the shift shaft.

2. The power unit according to claim 1,
wherein the crankcase includes a lower wall located below the shift lever and the stopper lever and above the oil pan, and
wherein the lower wall of the crankcase has an opening.

3. The power unit according to claim 2,
wherein the shift lever and the stopper lever are so disposed that when the shift shaft is located at the first rotational position, the shift lever and the stopper lever are located higher than the lower wall of the crankcase as viewed in the axial direction of the shift shaft.

4. The power unit according to claim 1,
wherein the shift lever is so disposed that when the shift shaft is located at the second rotational position, a portion of the shift lever is located lower than the frame portion or the lower wall of the crankcase and inside the oil pan as viewed in the axial direction of the shift shaft.

5. The power unit according to claim 1,
wherein the stopper lever is so disposed that when the shift shaft is located at the second rotational position, a portion of the stopper lever is located lower than the frame portion or the lower wall of the crankcase and inside the oil pan as viewed in the axial direction of the shift shaft.

6. The power unit according to claim 1, further comprising:
an internal combustion engine; and
an exhaust pipe through which exhaust gas discharged from the internal combustion engine flows,
wherein the oil pan includes a first lower wall, and a second lower wall recessed downward from the first lower wall,
wherein in a plan view, the shift lever overlaps the first lower wall of the oil pan, and the stopper lever overlaps the first lower wall of the oil pan,
wherein the exhaust pipe includes an exhaust pipe portion disposed lower than the first lower wall of the oil pan, the exhaust pipe portion overlapping the first lower wall in the plan view, and
wherein an upper end of the exhaust pipe portion is located higher than a lower end of the second lower wall of the oil pan.

7. The power unit according to claim 1, further comprising:
- a main shaft having a plurality of first gears including a first movable gear that is movable around an axis of the main shaft;
- a drive shaft having a plurality of second gears including a second movable gear that is movable around an axis of the drive shaft, the second gears being configured to intermesh with the first gears; and
- a shift fork configured to engage with the first movable gear and the second movable gear,
- wherein the shift drum has a groove with which the shift fork engages, and
- wherein when viewed in the axial direction of the shift shaft, a center of the shift drum is disposed lower than a center of the main shaft, and a center of the shift shaft is disposed lower than the center of the shift drum.

8. A straddle-type vehicle, comprising the power unit according to claim 1.

* * * * *